United States Patent [15] 3,706,973

Acquadro et al. [45] Dec. 19, 1972

[54] DYNAMIC KEYBOARD DATA ENTRY SYSTEM

[72] Inventors: Edward W. Acquadro; Donald F. Monahan, both of Boca Raton, Fla.

[73] Assignee: International Business Machines Corporation, Armonk, N.Y.

[22] Filed: Dec. 31, 1970

[21] Appl. No.: 103,241

[52] U.S. Cl. ..........340/172.5
[51] Int. Cl. ..........H04l 3/00, G06c 21/00
[58] Field of Search ..........340/172.5; 235/145, 156

[56] References Cited

UNITED STATES PATENTS

| | | | |
|---|---|---|---|
| 3,470,539 | 9/1969 | Proud et al. | 340/172.5 |
| 3,150,351 | 9/1964 | Tackovich | 235/145 X |
| 3,292,764 | 12/1966 | Midgette et al | 340/172.5 X |
| 3,381,276 | 4/1968 | James | 340/172.5 |
| 3,472,449 | 10/1969 | Marino | 340/145 X |

*Primary Examiner*—Paul J. Henon
*Assistant Examiner*—Ronald F. Chapuran
*Attorney*—Hanifin and Jancin and Earl C. Hancock

[57] ABSTRACT

Actuation of a key on a keyboard generates double bytes of binary information, one byte identifying the keyboard area in which the key is located and the other byte representing a weighted key code. These two bytes are utilized by a data processor to reference storage addresses where bytes encoded in ultimate utilization format are stored. The utilization code and/or the storage addresses can be dynamically converted without altering the keyboard.

8 Claims, 2 Drawing Figures

INVENTORS
EDWARD W. ACQUADRO
DONALD F. MONAHAN

BY Earl C. Hancock
ATTORNEY

DYNAMIC KEYBOARD DATA ENTRY SYSTEM

CROSS REFERENCES TO RELATED APPLICATIONS

Application Ser. No. 57,920, "Central Processing Unit" by E. D. Finnegan et al. which was filed July 24, 1970 and assigned to the same assignee as this application describes pertinent components of a central processing unit applicable for a typical utilization of the present invention. Application Ser. No. 52,488 entitled, "Input/Output Channel," by W. H. Bunker et al. which was filed July 6, 1970 and which is also assigned to the same assignee as the present application describes typical operating interrelationships between I/O devices and channels in conjunction with the aforementioned central processing unit. The keyboard described in the present application could operate as one of the I/O devices described in the Bunker et al. application.

BACKGROUND OF THE INVENTION

1. Field of the Invention

The present invention relates to apparatus for entering data from a keyboard into a central processing unit. More particularly, one aspect of the present invention is concerned with an arrangement for ultimately producing binary encoded data in a desired code from a keyboard which produces a fixed binary format in response to the actuation of any given key. The present invention is particularly useful for data processing equipments wherein various encoded data is to be produced without physically changing the mechanical apparatus associated with the keyboard for generating electronic signals.

2. Description of the Prior Art

Many keyboards have been developed which generate binary data in response to actuation of the keys thereof. In the past, the binary data thus produced has been generated in the desired digital format. For instance, U.S. Pat. No. 3,494,550, "Universal Keyboard," by R. K. Hayes et al. which is assigned to the same assignee as this application describes a keyboard wherein the actuation of a key will result in the production of a binary coded character at the output. These characters are generated by a diode matrix or the like and, in the past, the bytes of data thus generated have been arranged in the coded system for ultimate utilization. Frequently the so-called EBCDIC code is produced by such a keyboard. Unfortunately, these keyboards are limited in that the keyboard must be physically rearranged to produce characters in other codes when they are desired or translation apparatus must be included between the keyboard and the data processing equipments utilizing its output. Thus to shift a keyboard from one language to another, radical modifications have had to be performed upon the physical apparatus involved.

Such keyboards frequently also include keys which produce bytes representing specific functions or commands to be executed which are likewise generated in a particular format determined by the keyboard. Although the prior art keyboards have generally operated quite well for performing the data entry functions intended, they have lacked flexibility in that they tend to be poorly adapted for changing the binary coded bytes responding to the actuation of a given key.

SUMMARY OF THE INVENTION

The present invention advantageously utilizes mechanical keyboard arrangements similar to that disclosed in U.S. Pat. No. 3,494,550 by Hayes et al to generate weighted binary characters at the output in response to actuation of a key. Each of these weighted characters are then employed to reference a particular address in the storage of a central processing unit wherein binary characters of the desired utilization code have been prestored. Thus the utilization code can be dynamically changed by program control of the central processor with no need for physical changes of hardware.

In addition, the translating matrix associated with the keyboard can be arranged to permit even greater flexibility by generating two bytes of binary information, one of which is a status byte related to the area of the keyboard in which the key is located and the other of which is a weighted data byte uniquely associated with that particular key. These bytes are transferred to a processor system in much the same manner as the prior art except that they are utilized to generate addresses of areas in storage of the processor wherein binary data encoded in the desired format is located. The status byte is employed for determining which processing routine is to be used in interpreting the weighted data byte for identifying the particular storage address to be used.

By use of the present invention, a multiplicity of flexible operations become available to the system user. That is, specifically encoded binary data can be stored at predetermined address locations which correspond to the ultimate address obtained from the binary data byte generated by the actuation of the key on the keyboard. This properly encoded data is retrieved in a well known manner and utilized for effecting various combinations of results. When it becomes necessary to change the particular encoding of binary data to be generated in response to the actuation of a key, all that is required is that the byte stored at the address which will be generated from actuation of the key be changed to the new code. Further, the processing subroutines associated with the actuation of a given key can be rearranged to perform any desired function and can even be dynamically reallocated at the processor. Thus, the standard keyboard with its fixed binary characters can be employed for generating any desired output code.

A still further advantage of this invention resides in the fact that the weighted character of the bytes generated from key actuation makes it possible to manually compose data for entry into the processor.

Accordingly, an object of the present invention is to produce dynamically changeable binary encoded information from storage locations in a processing system in response to the actuation of a key.

Another object of the present invention is to interpret the point of origin of a given key in order to determine the particular location of a storage apparatus from which a desired binary coded character can be retrieved.

A still further object of the present invention is to generate dynamically changeable binary characters in response to a weighted binary code originating from actuation of a key on a keyboard with these characters being interchangeable without modification to the keyboard.

Yet another object of this invention is to provide means for composing binary data for data processing equipment in response to actuation of one or more keys on a keyboard.

The foregoing and other objects, features, and advantages of the present invention will be apparent from the following more particular description of the preferred embodiment of this invention as is illustrated in the accompanying drawings.

DESCRIPTION OF THE PREFERRED EMBODIMENT

Figure 1:
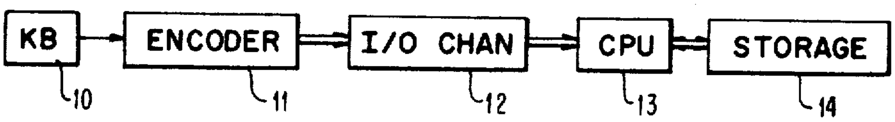
FIG. 1 illustrates the broad overall interrelationship of the keyboard and pertinent processing units which might be employed in utilizing the present invention.

FIG. 1 contains broad general blocks associated with implementation of the present invention. Keyboard 10 could typically utilize apparatus somewhat similar to that which is well known in the art for producing binary bytes of data in response to the actuation of a key but with modifications that will be apparent hereinafter. Actuation of any key on keyboard 10 would cause encoder 11 to generate a byte of data which is weighted as a function of the particular key actuated. In its simplest form, encoder 11 might represent a switched diode matrix which would produce a fixed weighted code in response to the actuation of a key. U.S. Pat. No. 3,494,550 with appropriate modification such as is shown in FIG. 2 hereof could be adapted to provide the mechanism of the keyboard 10 in conjunction with the FIG. 2 modification to generate encoder 11 outputs.

When a key on keyboard 10 has been actuated, encoder 11 typically would generate an interrupt signal, request for a cycle steal or the like depending upon the manner of implementation. This signal would be passed through I/O channel 12 to be accepted by CPU 13. The I/O channel operation described in the Bunker et al. application, Ser. No. 52,488 mentioned hereinbefore could typically be utilized for I/O channel 12 and the processing unit 13 with its associated storage 14 could be that described in the Finnegan et al. application, Ser. No. 57,920 also mentioned hereinbefore. The weighted binary code generated from actuation of a key in keyboard 10 is utilized by CPU 13 to reference a specific storage location in storage 14 to retrieve the correctly encoded data which is placed there in advance. Each key will have a unique weighted binary code assigned to it but, since the byte originating from keyboard 10 will always have the same weighted value for any given key, CPU 13 can utilize that byte as an index displacement to reference the location by generating an address that is a function of that byte. Further, in the event that the particular encoding to be produced should require changing, either the location at the storage address referenced by actuation of a given key can be changed or a new table can be stored at other addresses in storage 14 and the base used for indexing and referencing the new location can be modified in the CPU to reference the new location. It would generally be advantageous to encode the weighted binary data generated from the keys on keyboard 10 so that they are arranged in sequence since this would provide maximum utilization of storage 14 by only requiring a compact block of storage for the conversion table.

Figure 2:
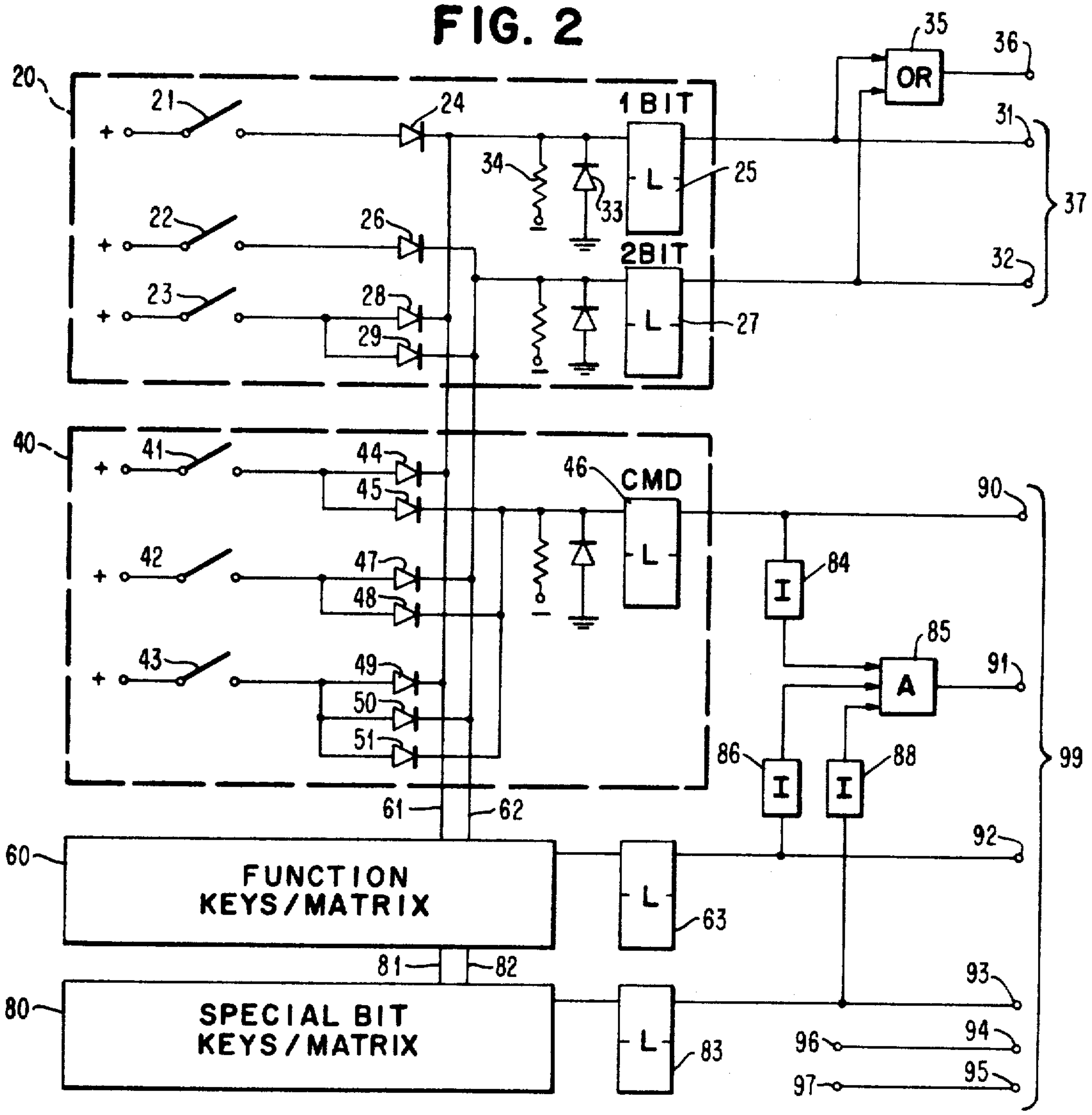
FIG. 2 shows specific circuitry in a somewhat simplified example of one means for generating appropriate keyboard data in response to actuation of a key.

The FIG. 2 circuitry illustrates an arrangement for responding to the actuation of keys in keyboard 10 and the general function of encoder 11 for producing pertinent bytes of data to be transferred to the processor. Circuitry for generating the weighted binary characters is generally illustrated in block 20 which shows the diode matrix and logic circuitry needed for generating two bits of the data byte to be composed at 37, it being understood that the number of bits actually implemented would generally be considerably greater in number than that shown. Switches 21, 22 and 23 correspond to three keys on keyboard 10 whose actuation ultimately reference respective alphanumeric characters. Thus, the actuation of a key on keyboard 10 closing switch 21 introduces a voltage through diode 24 so as to set latch circuit 25. Similarly, the actuation of another key would close switch 22 which causes current to be introduced through diode 26 so as to set latch 27 indicating yet another alphanumeric character. The actuation of the key associated with switch 23 causes current to be passed through diodes 28 and 29 resulting in the setting of both latch 25 and latch 27. Thus unique weighted codes are produced at output terminals 31 and 32 which correspond to the particular key which had been actuated and compose a byte of data at output 37. It should be understood that resistor 34 and diode 33 along with similar networks in other lines are included for the purpose of completing the current paths as well as reducing noise sensitivity.

As long as the particular area in the keyboard 10 does not require specific identification, only the circuitry shown in block 20 or the like need be utilized. The actuation of 21, 22 or 23 will result in the generation of an interrupt signal at terminal 36 through OR 35 to indicate to the processor that a byte of data is available and should be acquired for further processing. Of course, the use of the signal at 36 could likewise be employed for originating a cycle steal operation or the like rather than to initiate interrupt processing. With reference to the Bunker et al application, Ser. No. 52,488, the generation of a signal at terminal 36 would be introduced to the I/O channel as either a cycle steal or an interrupt request and in either case would be processed in the manner described in that application. The particular logic associated with generating a data Bus (DBI) signal corresponding to the priority level of the interrupt could be generated as shown in FIG. 10 in the Bunker et al. application but the specific apparatus utilized for generating the interrupts, assigning priority levels for servicing and the like do not form an essential part of the present invention and therefore will not be described further herein.

The ever increasing applications of data processing keyboard inputs require that various other operations, commands and functions be originated from keyboard operation. Block 40 illustrates an arrangement for responding to a command key which might be utilized by the processor for performing some specific function. The actuation of keys 41, 42 or 43 will result in the appropriate latch setting at latches 25 and/or 27 as discussed above and will likewise cause command latch 46 to be set. Thus, the actuation of a command key will generate a weighted key code byte of data at 37 and will also cause a signal to appear at terminal 90 which designates that this weighted data byte resulted from actuation of a command key. The weighted code data byte 37 identifies the particular command key that has been actuated. These commands might typically invoke a particular subroutine at the processor with the routine having been predefined and prestored. Additionally, function keys represented generally at block 60 can be used to cause the processor to respond with well-known keyboard functions such as carriage return, shift operations, or the like. Finally, special bit keys 80 might be included for the purpose of expanding the alphanumeric characters available through block 30 as is occasionally required in shifting from one language to another where the alphabets and the symbols used are not identical. Other definable keyboard areas could be included such as "adding machine" sections, etc.

Actuation of a key in function block 60 or special bit block 80 results in the respective setting of latches 63 or 83 and thus produces signals at 92 or 93. It should be noted that the circuitry required for generating a bit in status byte 99 specifically identifying that one of the alphanumeric keys 21–23 in block 20 has been actuated could be constructed in the same manner as for blocks 40, 60 and 80. That is, keys in 20 could set latches similar to 46, 63 or 83, if desired. However, the circuitry shown minimizes the number of components needed in that the actuation of any given key which fails to set either latch 46, 63 or 83 will cause AND circuit 85 to be set via inverter circuits 84, 86 or 88. Therefore, the bit present at terminal 91 indicates that the key which was actuated was one of alphanumeric keys 21, 22 or 23.

Additional bits can be incorporated into byte 99 such as terminals 94 or 95 or the like to indicate other portions of data relating to the keyboard. For instance, a signal at terminal 94 might indicate that the keyboard is ready while a signal at terminal 95 might indicate that the keyboard has been locked. These bits of information would be generated from other apparatus associated with the keyboard and/or the control circuitry associated therewith by any known means and are ancillary to the present invention. In any event, the actuation of a key on keyboard 10 would result in the generation of a bit at either 90, 91, 92 or 93 along with any additional data bits which might be associated therewith such as 94 and 95 to make up a status byte 99. In processing the response to actuation of a key, the processor would initially retrieve byte 99 and respond to the weighted code byte 37 in accordance with the contents of status byte 99.

The operation of the keyboard and its associated controls through an I/O channel such as the Bunker et al. application, Ser. No. 52,488, into a central processing unit such as that which is described in the Finnegan et al. application, Ser. No. 57,920, will now be described. The generation of an interrupt request at terminal 36 is sensed by the I/O channel and processor and, via local storage registers LSR specifically dedicated for interrupt processing, references a servicing subroutine previously stored in the processor. Typically this subroutine would initially store the instruction address register, index registers and the like associated with the program being processed but which is being interrupted. The subroutine would then load the local storage registers LSR to be used in processing the keyboard request with these LSRs performing as the required IAR, index registers and the like. Subsequently the subroutine would generate a Sense I/O data instruction which would result in two cycles of data acquisition, the first cycle retrieving the status byte 99 and the second cycle retrieving the data byte in its weighted code at 37. By way of example, the status byte might be stored at location 1001 in the processor storage and the weighted data byte 37 at location 1000.

The subroutine then performs a Test Bit Instruction on the status byte 99 to determine what area of the keyboard it represents and thus the particular indexing to be used. For instance, a bit being present at terminal 91 which would have been sensed and stored at location 1001 might be detected from this Test Bit Instruction which would indicate to the subroutine that an alphanumeric data bit is intended to be employed and therefore a specific index register in the LSR group will be used. For instance, the LSR performing as interrupt index register XR1 might be used to respond to a command key and contains 0100 as an indexing factor, whereas the LSR for XR2 might contain 0200 to be used for alphanumeric data referencing. Assuming that alphanumeric key 21 had been actuated which generated a data byte of 01 at 37, the subroutine responds by adding those two factors to generate a storage address of 0201 at which location might be the EBCDIC encoded character for a letter or number. The subroutine then retrieves that specially encoded character for any of a multiplicity of purposes such as to generate a print command, for storage at yet another location in which a message is being buffered, for transmission to a communication device, etc.

After the specific functions which have been encoded for this servicing subroutine have been performed, a start I/O instruction restores the keyboard and reloads the interrupted program into the appropriate instruction address register, index registers, and the like. That is, the original mainline program is returned to its original condition so that the interrupted program can continue being processed.

The command keys are program assigned keys used to permit the operator to influence the execution of the program routine. When depressed, a command key generates the weighted code byte 37 as mentioned and the interrupt request signal as well as the status byte 99. A Sense I/O Instruction will be sent to the keyboard from the CPU to accept the generated characters. The status byte identifies it as a command key character rather than data, function or special key character by the presence of bit 90 in status byte 99. The command key typically would be used to call special routines which usually differ from the standard routines associated with function keys. For instance, the routine prestored to respond to actuation of a particular command key might perform special mathematical computations upon data previously received or entered such as discounting, square root functions, Katakana shifts, etc.

Whether it be alphanumeric, command or otherwise, the byte of information resulting from actuation of a key is interrogated by the CPU program to determine from which base or constant it should index to address the correct system code which is contained in a table CPU storage. Simply by changing a key cap and the data in a specific core location, it is possible to allocate different system codes to the same physical key. This permits the flexibility required to service an almost unlimited number of key configurations and codes with the same keyboard.

The versatility and flexibility of this invention can be further appreciated from our article at pages 454–455 in the July 1970 IBM Technical Disclosure Bulletin (Vol. 13, No. 2) entitled, "Alter Storage Mode for Direct Keyboard Entry into Storage." That article describes a means for composing specific byte configurations by actuating selected keys. It permits manual entry of program modification, diagnostic information or even entire programs by advantageously applying the binary data available from weighted code byte 37. Further, the present invention can be easily modified to incorporate the so-called typamatic function wherein a given function or data entry is repetitively performed until the key is released. For instance, logic can be included to respond to a typamatic key by holding the interrupt request regardless of completion of interrupt processing so that repetitive interrupt services will be granted until the key is released. That is, the control logic associated with keyboards usually requires release and reactuation of a key before a second interrupt is honored since the CPU can frequently respond faster than a human. By appropriate status bit setting or even by command key functions, typamatic is available with this invention.

While the invention has been particularly described and shown relative to the foregoing embodiment, it will be understood by those having normal skill in the art that various other changes and modifications may be made without departing from the spirit of this invention.

What is claimed is:

1. Keyboard responsive control apparatus for interfacing with a data processing system which contains storage tables of data reflecting binary encoded characters and operation control information and which can respond through indexing to input signals for addressing said tables comprising a keyboard having a first plurality of keys corresponding to data characters and a second plurality of keys corresponding to operations of said data processing system, a multiple bit position register, means for coupling said keys to said register for producing at least one binary data byte uniquely weighted to correspond with the originating said key, means responsive to loading of said register by actuation of one of said keys for indicating to said data processing system that said register is loaded, and means for coupling the content of said register to said data processing system whereby said data processing system will utilize said register content to address said storage tables and provide a response correlated therewith.

2. Apparatus in accordance with claim 1 wherein said register includes first and second portions, said first portion reflecting the amount of indexing to be used by said data processing system and said second portion representing a status byte identifying the functional area of said keyboard in which an actuated said key is located, whereby said data processing system responds to said second portion to select a said storage table and indexes within said table as a function of the said first portion.

3. Apparatus in accordance with claim 2 wherein said register contains first and second groups of said bit positions, all of said keys being coupled to said first group, and each said key of said second plurality being additionally coupled to at least one said bit position in said second group.

4. Apparatus in accordance with claim 3 which further includes logic means responsive to actuation of a key in said first plurality of keys and the absence of actuation of a key in said second plurality of keys for setting a said bit position in said second group for positively indicating to said data processing system that a said key in said first plurality has been actuated.

5. Apparatus for providing interchangeable binary coded manifestations in response to operation of a keyboard comprising a keyboard including a plurality of keys, encoding means responsive to actuation of any key on said keyboard for producing at least one binary byte with said byte being arranged in a weighted format corresponding to said key originating said byte, means for retrieving said byte from said encoding means, means for storing a multiplicity of preselected binary coded characters at addressable storage locations, and means selectably responsive to each of said binary bytes from said encoding means for generating a signal identifying the address of a said storage location corresponding to one of said preselected binary coded characters, whereby binary encoded bytes having selectable formats can be obtained from said storing means in response to fixed binary bytes from said encoding means.

6. Apparatus in accordance with claim 5 wherein said encoding means includes means for generating a weighted binary byte and a status bit in response to actuation of each of said keys, and said storage address identifying means includes means for indexing said weighted byte in response to said status bit for producing a resultant storage address.

7. Apparatus in accordance with claim 5 wherein said status bit identifies a predefined area of said keyboard in which the said key associated therewith is located.

8. Apparatus in accordance with claim 7 wherein one of said predefined areas contains keys for generating alphanumeric characters and at least one other of said predefined areas contains keys for effecting special operational responses, said storage address identifying means responding to status bits indicating said one of said predefined areas by referencing a location within a prestored table in said storage containing binary characters in the desired utilization code while responding to status bits identifying said other of said predefined areas by referencing appropriate locations of said storage containing prestored instructions for performing said special operational response.

* * * * *